Patented Sept. 13, 1949

2,482,069

UNITED STATES PATENT OFFICE 2,482,069

PREPARATION OF ADENYLIC AND THIO-ADENYLIC ACID

Simon L. Ruskin, New York, N. Y., assignor to Frances R. Ruskin

No Drawing. Application November 6, 1944, Serial No. 562,272

21 Claims. (Cl. 260—211)

The present invention relates to the synthesis of adenylic acid and of 2-thio-adenylic acid, and of valuable intermediates obtained in the course of manufacture of such acids.

Adenylic acid is one of the phosphoric esters of nucleosides, also known as nucleotides, contained in the nucleic acid complexes of animal and vegetable origin. It has valuable physiological and nutritional properties, and has been employed in human therapy, particularly in the form of its metal salts. See, for examples, my United States Patents Nos. 2,101,099, 2,115,751.

Hitherto adenylic acid has been manufactured from nucleoproteins and nucleic acids by a laborious and expensive process involving its isolation from the other purine and pyrimidine nucleotides contained in the starting material; in fact so high has been its cost as to prohibit its general use.

It is the general object of the present invention to provide a relatively simple and inexpensive process for the manufacture of adenylic acid and likewise of thio-adenylic acid by the use of comparatively inexpensive materials.

A further object of the invention is to provide a process for the manufacture of adenylic acid involving a series of simple reactions which can be carried out without the aid of any special or complicated apparatus.

A still further object of the invention is to provide a process for the manufacture of adenylic and thio-adenylic acids from uric and thio-uric acids, respectively. Other objects of the invention will become apparent as the more detailed description of the invention proceeds.

According to the invention the starting material employed for the manufacture of adenylic acid is uric acid, which is a readily available material. The three hydroxyl groups of the uric acid are first halogenated by treatment with a suitable halogenating agent. It is preferred to convert the acid into the trichloro derivative, for example, by the use of phosphorus oxychloride, yielding 2,6,8-trichlorpurine. The latter compound is now treated with ribose or with an acylated brom-d-ribose, like bromo-triacetyl, as by boiling under anhydrous conditions, as in absolute methyl or ethyl alcohol, or other suitable solvent, to form the corresponding riboside. The riboside is then treated to convert the 6-chloro group into an amino group, ammonium hydroxide being a suitable reagent for this purpose, and the reaction being controlled to limit the substitution to the 6-group, as by restricting the amount of ammonia to approximately one equivalent.

The resulting compound is 2,8-dichloradenineriboside, or the corresponding triacyl derivative which is then hydrolized to replace the chlorine atoms with hydrogen. This reaction can be conveniently effected with a hydrohalic acid, preferably hydriodic acid with the aid of phosphonium iodide. This reaction produces adenine riboside (adenosine) or the corresponding triacyl compounds. The adenine riboside is converted into adenylic acid by phosphorylation. This last step is preferably carried out by the use of intestinal mucosa, the desired chemical reaction being aided by the enzymes normally present in the mucosa. This last step is itself known, having been conducted on adenine riboside obtained by the progressive hydrolytic decomposition of nucleoproteins, and other known methods of phosphorylation of the adenine riboside may be employed.

In an alternative procedure using bromotriacyl ribsoside, the formed adenine riboside triacylate is converted to the mono-acetone derivative of adenine riboside by treatment with acetone and a suitable catalyst, like zinc chloride, and the product is phosphorylated by treatment with POCl₃ or equivalent material, preferably in dry pyridine solution. Upon subsequent acid hydrolysis, adenylic acid is obtained.

While the orders of reactions just indicated are the preferred ones, it is to be understood that reversal of the order of certain of the reactions falls within the scope of the invention. Thus the adding on of the ribose radical can be made to take place after the replacement of the 6-chlorine atom with the amino group instead of prior thereto.

By starting with 2-thio uric acid, an analogus series of reactions yields 2-thio-adenylic acid.

The invention is illustrated more in detail in the following examples:

EXAMPLE I

*Preparation of 2,6,8-trichlorpurine*

168 g. (1 mole) uric acid were covered with 70 parts of phosphorous oxychloride and the reaction mixture autoclaved 4 hours at 150–155° C. Excess POCl₃ was removed in vacuo. An amorphous product remained which crystallized on stirring with water. It was filtered by suction, and washed with water. The yield was almost quantitative. The product could be crystallized from water for further purification. Yield of pure product was 65%.

Reaction:

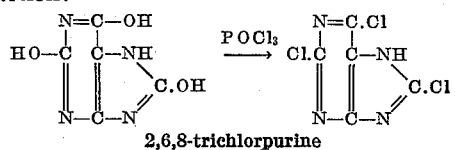

2,6,8-trichlorpurine

Condensation of 2,6,8-trichlorpurine with ribose 223.5 g. (1 mole) of 2,6,8 trichlorpurine and 150 g. (1 mole) ribose were added to 1000 cc. absolute methyl alcohol and the reaction mixture boiled for 3 hours. The solution was then filtered and concentrated in vacuo to about 500 cc. On cooling in the ice chest the reaction product crystallized. Yield 80%.

Reaction:

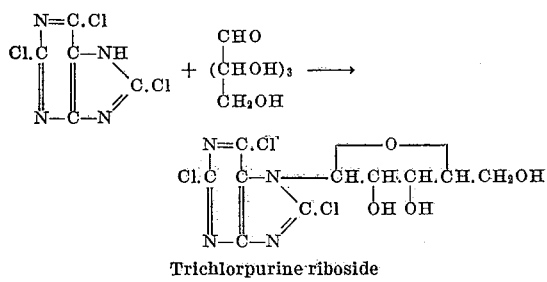

Trichlorpurine riboside

Preparation 2,8-dichloradenine-riboside 355.5 g. (1 mole) 2,6,8-trichlorpurine riboside was autoclaved at 100° C. for 6 hours with 10 parts of ammonium hydroxide. After completion of the reaction, the mixture was filtered, and then concentrated on the water bath until dry. The pure dichloradenine is formed. It is extracted with water to remove ammonium chloride.

Reaction:

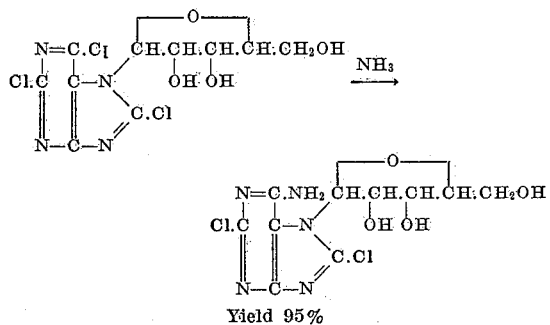

Yield 95%

Preparation of adenine riboside 336 g. of 2,8-dichlor-adenine riboside were treated with 10 parts of hydriodic acid (sp. gr. 1.96) and an excess of phosphonium iodide. The reaction mixture was then shaken two hours at room temperature. The hydriodic acid salt of the adenine riboside precipitated during the reaction. The reaction mixture was thereupon heated to a clear solution and neutralized with ammonium hydroxide. Yield 80%.

Reaction:

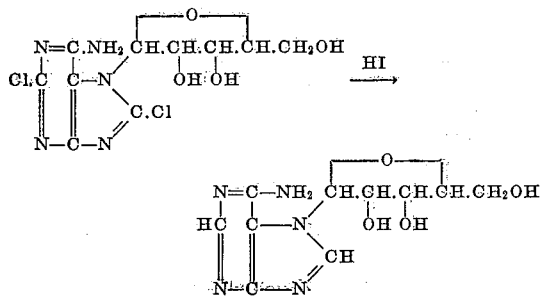

Preparation of adenylic acid by phosphorylation of adenine riboside 20 g. of adenine riboside were dissolved in 3000 cc. phosphate buffer at pH 6.8. To this was added 1 kg. of dry powdered intestinal mucosa obtained from a pig, rat or cat. The contents were well stirred and then placed in an incubator for about 20 hours. During this time the contents must be kept sterile and away from light. After incubation the reaction mixture was boiled for 5 minutes with two drops of octyl alcohol to prevent foaming. It was then centrifuged and filtered through a Berkfeld filter. The product may be isolated by concentrating in vacuo on a 40° C. bath. Yield 75%.

Reaction:

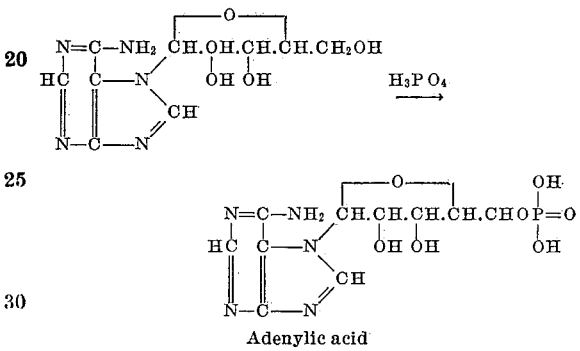

Adenylic acid

EXAMPLE II

Preparation of trichlorpurine riboside

A mixture of 223.5 g. (1 mole) trichloro purine and 339 g. (1 mole) bromo-triacetyl d-ribose was heated at 65° for eighteen hours. After 30 minutes there was complete solution and in two hours large colorless plates started to separate. The final reaction mixture consisted of a mush of crystals in a pale yellow syrup. It was treated with 150 cc. of dry ether, filtered and the solid washed with ether. Yield 300 g. or 62%.

The product was recrystallized from 1500 cc. of hot 95% alcohol and deposited needles on rapid cooling. M. P. 240° C. This riboside was very soluble in cold chloroform, soluble in hot alcohol, slightly soluble in ether and sparingly soluble in water.

Preparation of 2,8 dichlor-adenine d-riboside 481.5 g. (1 mole) trichloro-purine triacetyl riboside were heated with an excess of alcoholic ammonia at 100° C. for approximately four hours. On cooling and concentrating in vacuo, the product crystallized out. Yield 250 g. or 70%.

The product is soluble in hot alcohol and slightly soluble in hot acetone.

As an alternative, the reaction may also be run in aqueous ammonia at 100° C. and the residue concentrated to dryness. On extracting the residue with hot alcohol and cooling the new product is precipitated.

Preparation of adenosine

The adenosine (adenine riboside) was prepared in the manner described in Example I from 336 g. (1 mole) of 2,8 dichloroadenine riboside. After warming the reaction mixture containing the HI salt (the product contained two HI groups) it was treated with a slight excess of ammonium hydroxide. On cooling adenosine precipitated. It was dried at 120° C. Yield 200 g. or 76%.

Preparation of monoacetone adenosine 200 g. of granulated anhydrous zinc chloride were quickly transferred to a tarred flask and treated with 5000 cc. acetone. The small amount of white insoluble material was filtered off and to the clear, colorless filtrate were added 267 g. of dry, finely powdered adenosine. The suspension was boiled under a reflux condenser, closed by a calcium chloride tube until the adenosine had dissovled (3 hours). The clear, pale yellow solution was allowed to stand overnight at room temperature with the exclusion of atmospheric moisture and was then evaporated under diminished pressure to a volume of 600 cc. Dry ether (250 cc.) was now cautiously added with shaking and the white fluocculent precipitate filtered off, well washed with dry ether, and dried in the vacuum desiccator. Yield 200 g. or 60% theory.

Phosphorylation of monoacetone adenosine

To a solution of 100 cc. of phosphorus oxychloride in 500 cc. of dry pyridine cooled to −40° C. was added a solution of 325 g. of dry monacetone adenosine in 10 liters of dry pyridine cooled to −30° C. The mixture was stirred, cooled to −35° C. and then allowed to stand at −10° to −15° C. for 2 hours. It was recooled to −35° and 1000 cc. of cold 90% aqueous pyridine were added slowly with vigorous stirring and cooling to prevent the temperature from rising above −20° C. Chopped ice and 2000 cc. ice water were now added followed by a cold, saturated barium hydroxide solution until the mixture was faintly alkaline to phenolphthalein. On evaporating somewhat under diminished pressure a white precipitate consisting of the barium salt of phosphomonacetone adenosine settled out and was separated by centrifuging.

Hydrolysis of barium acetone adenosine 5-phosphate 530 g. (1 mole) barium acetone adenosine 5-phosphate were heated for 7 minutes at 100° C. with 2000 cc. N H₂SO₄. After complete solution was effected with further addition of water, the reaction mixture was allowed to cool and the excess H₂SO₄ quantitatively removed with Ba(OH)₂ and separated by centrifugation. The solution was evaporated to a small volume under diminished pressure. Neutral lead acetate was added until no more precipitate formed. The lead precipitate was well washed, suspended in water and decomposed with hydrogen sulfide. The filtrate was evaporated to 1000 cc. under diminished pressure and acetone was added until no more precipitate formed. A crystalline product was obtained. Yield 300 g. or 86%.

The reactions involved are as follows:

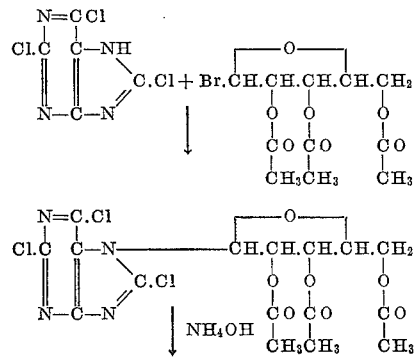

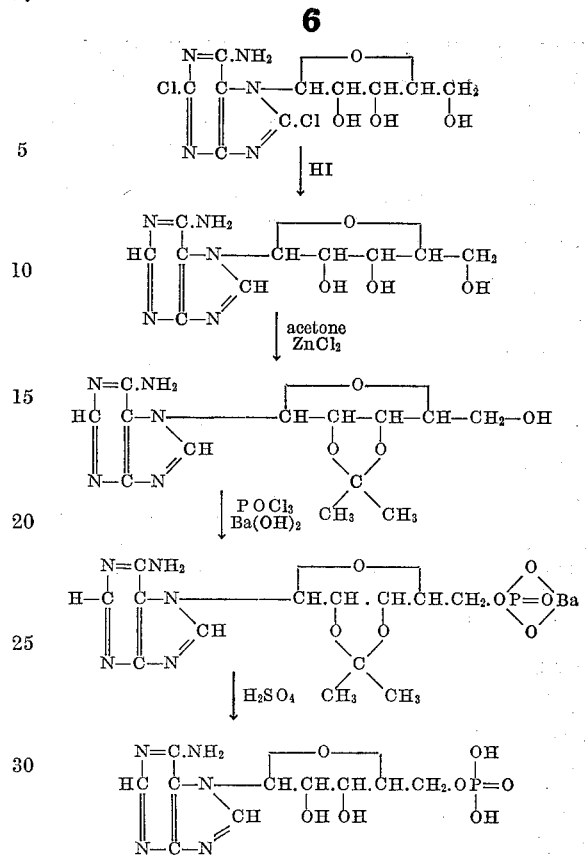

I claim:

1. Process for the manufacture of adenylic acid, comprising treating 2,8-dichloradenine riboside with an agent capable of replacing the chlorine with hydrogen, and phosphorylating the adenine riboside so obtained.

2. Process for the manufacture of adenylic acid, comprising heating 2,6,8-trichlorpurine riboside with ammonia to produce 2,8-dichloradenine riboside, treating the latter with hydriodic acid and phosphonium iodide, and phosphorylating the adenine riboside so obtained.

3. Process for the manufacture of adenylic acid, comprising heating 2,6,8-trihalogeno-purine riboside with ammonia to produce 2,8-dihalogenoadenine riboside, replacing the halogen with hydrogen, and phosphorylating the adenine riboside so obtained.

4. Process for the manufacture of adenylic acid, comprising halogenating uric acid to produce 2,6,8-trihalogenopurine, condensing the latter with ribose, heating the product with ammonia, reacting the 2,8-dihalogeno-adenine riboside so obtained with an agent capable of replacing the halogen with hydrogen, and thereafter treating the product so obtained with a phosphorylating agent.

5. Process for the manufacture of adenylic acid, comprising chlorinating uric acid by heating the same with phosphorus oxychloride, condensing the trichloro reaction product with ribose, heating the riboside with ammonia to replace the 6-chlorine with the amino group, treating the obtained 2,8-dichloradenine riboside with hydriodic acid and phosphonium iodide to replace the remaining two chlorine atoms with hydrogen, and phosphorylating the resulting adenine riboside.

6. Process for the manufacture of adenylic acid, comprising halogenating uric acid to form the 2,6,8-trihalogeno purine compound, reacting the latter with ribose to convert it to the riboside, treating the riboside with approximately one equivalent of ammonia to replace the 6-halogeno group with amino, replacing the 2,8-halogeno groups with hydrogen, and phosphorylating the adenine riboside so produced.

7. In a process for the manufacture of adenylic and thio-adenylic acids, the steps which comprise halogenating a member of the class consisting of uric acid and 2-thio uric acid to replace the hydroxyl with halogen, reacting the halogenated compound with a member of the class consisting of ribose and a halogeno acylated ribose, replacing the 6-halogeno with an amino group, thereafter replacing the remaining halogen with hydrogen, and phosphorylating the adenine or thio-adenine riboside so produced.

8. Process according to claim 7, wherein the halogenating agent is a chlorinating agent.

9. The process which comprises reacting a member of the class consisting of 2,6,8-trihalogeno-purine and 2-thio-6,8-dihalogeno purine with ribose to produce the corresponding riboside, and reacting the product with an amidating agent to replace the 6-halogen with an amino group.

10. Process for the manufacture of adenine riboside, comprising treating 2,8-dihalogeno-adenine riboside with hydriodic acid and phosphonium iodide to replace the halogen with hydrogen.

11. Process for the manufacture of 2-thio-8-halogeno adenine riboside, comprising reacting 2-thio-6,8-dihalogeno purine riboside with an amidating agent to replace the 6-halogen with an amino group.

12. In a process for the manufacture of adenine riboside and 2-thio-adenine riboside, the step which comprises reacting a member of the class consisting of 2,8-dihalogeno adenine riboside and 2-thio-8-halogeno adenine riboside with an agent capable of replacing halogen with hydrogen.

13. Process for the manufacture of 2-thio-adenylic acid, comprising halogenating 2-thio uric acid to form the 2-thio-6,8-dihalogeno purine compound, reacting the latter with ribose to convert it to the riboside, treating the latter with approximately one equivalent of ammonia to replace the 6-halogeno group with amino, replacing the 8-halogeno group with hydrogen, and phosphorylating the 2-thio-adenine riboside so produced.

14. In a process for the manufacture of adenylic and thio-adenylic acids, the steps which comprise halogenating a member of the class consisting of uric acid and 2-thio uric acid to form the corresponding 2,6,8-trihalogeno or 2-thio-6,8 dihalogeno purine compound, reacting the latter with aceto-brom-ribose, replacing the 6-halogen with hydrogen, reacting the product with acetone, phosphorylating the acetone derivative so obtained, and thereafter hydrolyzing the phosphoric acid derivative to remove the acetone.

15. Process for the manufacture of adenylic acid, comprising reacting 2,6,8-trihalogeno purine with halogeno-triacyl-d-ribose, amidating the product in the 6-position, dehalogenating the 2,8-dihalogeno adenine d-riboside so obtained, reacting the adenosine with acetone to form the monoacetone derivative, and phosphorylating and hydrolyzing the intermediate to adenylic acid.

16. In a process for the manufacture of adenylic acid, the steps which comprise reacting adenosine with acetone to form the monoacetone derivative, phosphorylating the latter to form the phosphate, and hydrolyzing to split off the acetone.

17. A member of the group consisting of 2,8-dihalogeno-adenine riboside and its 2-thio analogue.

18. 2,8-dihalogeno-adenine riboside.
19. 2-thio-8-halogeno-adenine riboside.
20. 2,8-dichloro-adenine riboside.
21. 2-thio-8-chloro-adenine riboside.

SIMON L. RUSKIN.

REFERENCES CITED

The following references are of record in the file of this patent:

"Nucleic Acids," Levene, A. C. S. Monograph Series No. 56, pages 92, 142, 175, 176.

Chemical Abstracts, vol. 34, page 3754 (1940). (Abstracted from Ber. 73B, pages 269–273, 1940.)

Fischer: Ber. Deut. Chem., vol. 47, pages 214–216 (1914).